United States Patent
Testin

(10) Patent No.: US 6,870,578 B2
(45) Date of Patent: Mar. 22, 2005

(54) APPARATUS AND METHOD FOR SHARING SIGNAL CONTROL LINES

(75) Inventor: William John Testin, Indianapolis, IN (US)

(73) Assignee: Thomson Licensing SA., Boulogne Cedex (FR)

( * ) Notice: Subject to any disclaimer, the term of this patent is extended or adjusted under 35 U.S.C. 154(b) by 509 days.

(21) Appl. No.: 10/024,981

(22) Filed: Dec. 19, 2001

(65) Prior Publication Data

US 2003/0112375 A1 Jun. 19, 2003

(51) Int. Cl.[7] ............................................... H04N 5/44
(52) U.S. Cl. ........................ 348/725; 348/730; 348/719
(58) Field of Search ................................ 348/725, 714, 348/718, 719, 730, 836, 552; 345/530–574, 214, 211, 212; 455/3.06; 713/320, 323, 324, 340; 711/103, 115; 710/110, 14, 60; H04N 5/44, 9/64, 5/63

(56) References Cited

U.S. PATENT DOCUMENTS

| | | | | | |
|---|---|---|---|---|---|
| 5,563,655 | A | * | 10/1996 | Lathrop | 348/714 |
| 5,748,255 | A | * | 5/1998 | Johnson et al. | 348/725 |
| 6,151,077 | A | * | 11/2000 | Vogel et al. | 348/725 |
| 6,693,678 | B1 | * | 2/2004 | Tults et al. | 348/571 |

\* cited by examiner

*Primary Examiner*—Sherrie Hsia
(74) *Attorney, Agent, or Firm*—Joseph S. Tripoli; Harvey D. Fried; Reitseng LIN

(57) ABSTRACT

An apparatus such as a television signal receiver includes first and second circuit boards. The first circuit board includes a first device such as a memory, and control circuitry for controlling at least one function of the apparatus. The second circuit board is operably coupled to the first circuit board via control lines. The second circuit board includes a controller for generating first and second control signals. The control lines transmit the first control signals from the controller to the first device when the apparatus is in a first operational state, and transmit the second control signals from the controller to the control circuitry when the apparatus is in a second operational state.

20 Claims, 2 Drawing Sheets

APPARATUS AND METHOD FOR SHARING SIGNAL CONTROL LINES

BACKGROUND OF THE INVENTION (1) Field of the Invention

The present invention generally relates to electrical devices comprising components mounted on a plurality of circuit boards, such as television signal receivers, and more particularly, to a technique for reducing the number of connections required between circuit boards in such devices by enabling signal control lines to be shared.

(2) Description of Related Art

Electrical devices such as television signal receivers often include one or more circuit boards. Each circuit board typically includes electrical components mounted thereon, such as integrated circuits ("ICs") and other elements, which enable various device operations to be performed. Prior designs for television signal receivers often employed only a single circuit board. With these prior designs, a primary incentive was to maximize the use of board area. However, since only one circuit board was used, no issues regarding connections between different circuit boards existed.

Current designs for television signal receivers, on the other hand, may use multiple circuit boards. The use of multiple circuit boards, as compared to a single board, is particularly attractive since it enables the circuit design to be modularized. In particular, different board sections can be re-designed without having to reorganize the layout of all receiver circuits, as is often the case when using only a single circuit board. Moreover, the use of multiple circuit boards allows a single-sided board to be used for one group of circuits, and a multi-layer board for other circuits.

Despite its advantages, the use of multiple circuit boards may create difficulties with regard to the connections between different boards. In particular, it is desirable to minimize the number of connectors (e.g., pins) used to provide a connection between circuit boards. Minimizing the number of such connectors is particularly desirable since the cost of each connector is quantifiable in a monetary sense. This is particularly significant in certain industries, such as the consumer electronics industry, where product cost is a driving force among competitors and small cost per unit may be significant in view of the total number of units produced. Accordingly, there is a need for a technique that reduces the number of connections required between circuit boards in an apparatus, such as a television signal receiver. The present invention addresses these and other issues.

BRIEF SUMMARY OF THE INVENTION

In accordance with the present invention, an apparatus such as a television signal receiver comprises first and second circuit boards. The first circuit board includes a first electronic device, such as a memory, and a second electronic device, such as control circuitry for controlling at least one function of the apparatus. The second circuit board is operably coupled to the first circuit board via control lines. The second circuit board includes a controller for generating first and second control signals, in accordance with first and second signal formats, respectively. The control lines transmit the first control signals from the controller to the first device when the apparatus is in a first operational state, and transmit the second control signals from the controller to the control circuitry when the apparatus is in a second operational state. A method performed by the foregoing apparatus is also disclosed herein.

BRIEF DESCRIPTION OF THE SEVERAL VIEWS OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION OF THE INVENTION

Figure 1:
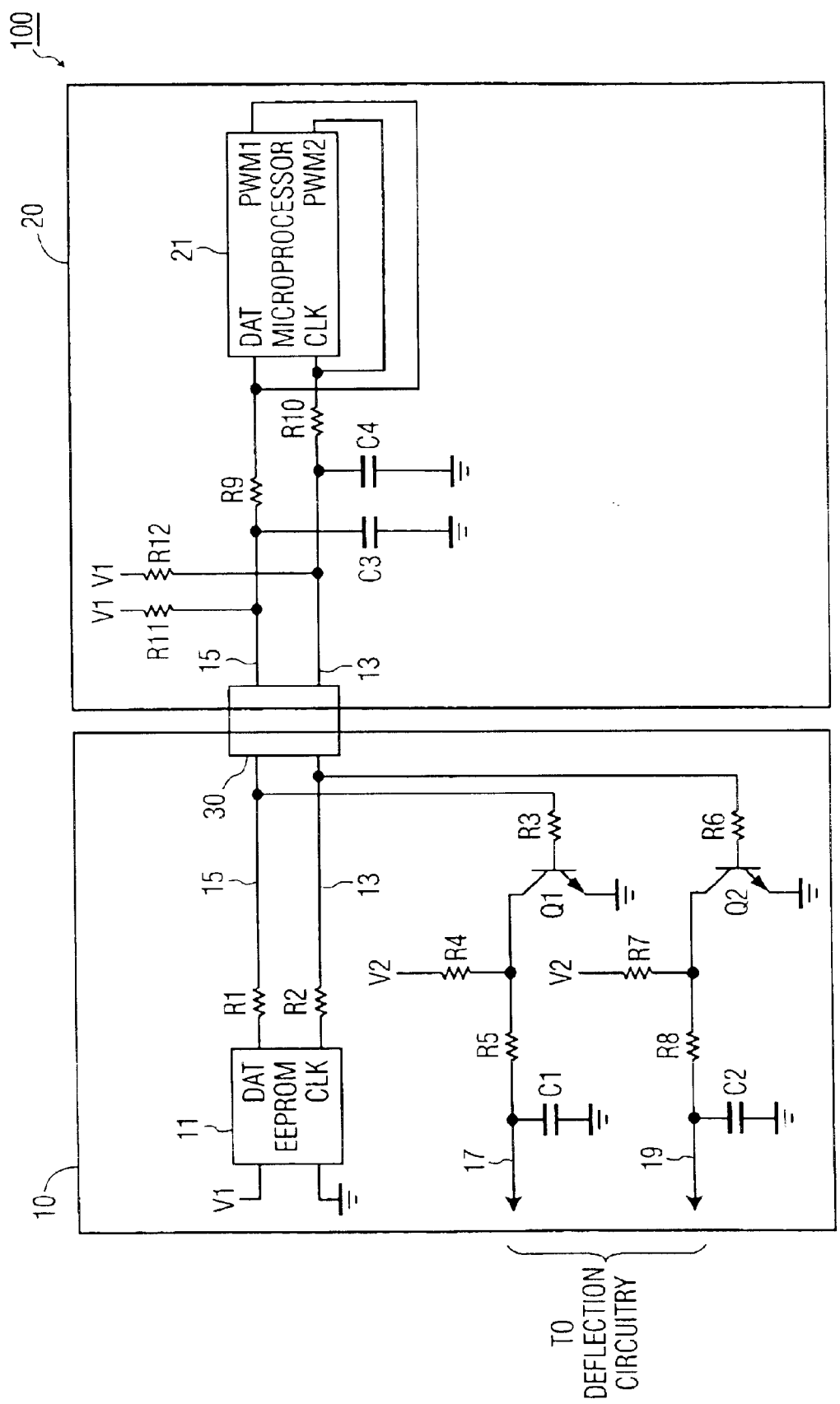
FIG. 1 is a diagram of a relevant portion of an apparatus suitable for implementing the present invention.

Referring now to the drawings, and more particularly to FIG. 1, a diagram of a relevant portion of an apparatus 100 suitable for implementing the present invention is shown. For purposes of example and explanation, apparatus 100 of FIG. 1 is represented as a television signal receiver. However, it is noted that the principles of the present invention may be applicable to other types of electronic devices that use multiple circuit boards.

Receiver 100 of FIG. 1 comprises a first circuit board 10, a second circuit board 20, and a board connector 30. According to an exemplary embodiment, first circuit board 10 enables operations related to power supply and deflection functions of receiver 100, and second circuit board 20 enables operations related to signal processing functions of receiver 100. First board 10 is electrically connected to second circuit board 20 via board connector 30.

First circuit board 10 includes an electrically erasable, programmable read-only memory ("EEPROM") 11 which operates as a non-volatile memory for storing data, such as voltage data used to control deflection operations of receiver 100. EEPROM 11 includes a clock ("CLK") terminal and a data ("DAT") terminal, and is powered by a voltage source V1, which according to the exemplary embodiment is 3.3 volts. The CLK terminal is electrically coupled to a serial clock line ("SCL") 13, and the DAT terminal is electrically coupled to a serial data line ("SDL") 15. According to an exemplary embodiment, SCL 13 and SDL 15 collectively represent an inter-integrated circuit ("IIC"—typically pronounced "I-squared C") bus, and may be referred to herein as bus lines or control lines.

The format and use of the IIC bus for transferring control and data signals between various ICs is well known by those skilled in the art. In general, an IIC bus is a two transmission medium, bidirectional digital bus that permits two or more ICs to communicate on a bus path. An IC serving in a "master" mode of operation, initiates a data transfer operation on the bus and generates clock signals that permit the data transfer. An IC serving in a "slave" mode of operation is the IC being operated on or communicated to by the master IC, whereby the slave IC is instructed to either send or receive data. Each IC has its own unique address, wherein the master IC initiates and terminates the communications. Further details regarding the IIC bus represented by SCL 13 and SDL 15 will be provided later herein First circuit board 10 also includes eight resistors R1 to R8, two capacitors C1 and C2, and two transistors Q1 and Q2. Resistors R1 and R2 are provided to create resistance on SDL 15 and SCL 13, respectively. In the exemplary embodiment, resistors R1 and R2 each provide 1K ohms of resistance. As indicated in FIG. 1, SCL 13 and SDL 15 are tapped in first circuit board 10 to provide two separate control channels. In particular, SDL 15 is tapped to provide a first control channel which generates an output signal represented at reference numeral 17, and SCL 13 is tapped to provide a second control channel which generates an output signal represented at reference numeral 19. Output signals 17 and 19 control deflection operations of receiver 100. The circuitry making up the first and second control channels may collectively be referred to herein as control circuitry.

The first control channel includes resistors R3 to R5, capacitor C1, and transistor Q1. Resistor R3 provides a resistance between SDL 15 and the base junction of transistor Q1, and has a preferred value of 10K ohms. Transistor Q1 is preferably embodied as an n-type bipolar junction transistor ("BJT"). The collector junction of transistor Q1 provides an output path for the first control channel. Resistor R4 operates as a pull-up resistor and is electrically coupled to a voltage source V2, which according to an exemplary embodiment is 5.1 volts. The preferred value for resistor R4 is 1K ohms. Resistor R5 and capacitor C1 establish a time constant, and preferably have values of 1K ohms and 820 nanofarads, respectively. According to the exemplary embodiment, output signal 17 is used to establish the voltage of a flyback transformer (not shown), which is used in the deflection operations of receiver 100.

The second control channel includes resistors R6 to R8, capacitor C2, and transistor Q2. Resistor R6 provides a resistance between SCL 13 and the base junction of transistor Q2, and has a preferred value of 10K ohms. Transistor Q2 is preferably embodied as an n-type BJT. The collector junction of transistor Q2 provides an output path for the second control channel. Resistor R7 operates as a pull-up resistor and is electrically coupled to voltage source V2, which as previously indicated is 5.1 volts. The preferred value for resistor R7 is 1K ohms. Resistor R8 and capacitor C2 establish a time constant, and preferably have values of 1K ohms and 820 nanofarads, respectively. According to the exemplary embodiment, output signal 19 is used to control the voltage of the flyback transformer (not shown). Also, resistors R3 and R6 preferably are chosen to have sufficiently high resistances to prevent the loading of the IIC bus.

Second circuit board 20 includes a microcontroller 21 which controls various operations of receiver 100. Like EEPROM 11 of first circuit board 10, microcontroller 21 also includes a CLK terminal and a DAT terminal. The CLK terminal is electrically coupled to SCL 13, and the DAT terminal is electrically coupled to SDL 15. Although not expressly shown in FIG. 1, microcontroller 21 is electrically connected to a voltage source, such as voltage source V1. The terms "microcontroller" and "controller" may be used interchangeably herein.

Microcontroller 21 also includes first and second pulse width modulated ("PWM") terminals ("PWM1" and "PWM2") which output first and second PWM signals, respectively. The PWM1 and PWM2 terminals are electrically coupled to SDL 15 and SCL 13, respectively, and thereby provide the first and second PWM signals to the first and second control channels of first circuit board 10, respectively. Accordingly, the first PWM signal is used to generate output signal 17, and the second PWM signal is used to generate output signal 19. While PWM signals are utilized in a preferred embodiment, signals of other formats may, of course, also be utilized.

Second circuit board 20 also includes four resistors R9 to R12, and two capacitors C3 and C4. Resistor R9 and capacitor C3 operate to filter out radio frequency interference from SDL 15, while resistor R10 and capacitor C4 operate to filter out radio frequency interference from SCL 13. According to an exemplary embodiment, resistors R9 and R10 each have values of 1K ohms, and capacitors C3 and C4 each have values of 100 picofarads. Resistors R11 and R12 operate as pull-up resistors and are electrically coupled to voltage source V1, which as previously indicated is 3.3 volts. Resistors R11 and R12 each have values of 10K ohms.

In operation, the IIC bus (i.e., SCL 13 and SDL 15) is shared between two different operations of microcontroller 21. In particular, when receiver 100 is in a first operational state (i.e., receiver 100 is connected to a power source, but is in the OFF state), microcontroller 21 operates as a master IC and transmits first control signals to EEPROM 11 via SCL 13 and SDL 15 to thereby read data from EEPROM 11, which operates as a slave IC. As such, the DAT pin is an input/output line and the CLK operates as an output pin. The PWM1 and PWM2 pins operate as input lines, or in a high impedance state. The state of the pins is determined by the microcontroller 21 in response to the current operational state, for example using the data directional registers. Microcontroller 21 and EEPROM 11 receive electrical power from a standby power source, namely voltage source V1, during the first operational state. According to an exemplary embodiment, the data read from EEPROM 11 by microcontroller 21 comprises voltage data used to control deflection operations of receiver 100.

During the data reading operation, SCL 13 propagates clock signals from microcontroller 21 to EEPROM 11. SDL 15 is used to transfer data using serial digital transactions. Typically, one or more bits are used as acknowledgment bits. According to an exemplary design, when both SCL 13 and SDL 15 are held in a logic high state, no data can be transferred between microcontroller 21 and EEPROM 11. A transition from a logic high state to a logic low state on SDL 15, while SCL 13 is in a logic high state, indicates a start condition for the exchange of digital data over the IIC bus. Conversely, a transition from a logic low state to a logic high state on SDL 15, while SCL 13 is in a logic high state, indicates a stop condition. According to an exemplary embodiment, microcontroller 21 generates one clock pulse for each bit of digital data transferred on SDL 15, and a logic state on SDL 15 can only change when the clock signal on SCL 13 is in a logic low state. Of course, signal protocols other than the foregoing one may be used. When microcontroller 21 reads data from EEPROM 11, the PWM1 and PWM2 terminals of microcontroller 21 are in a high-impedance state, and resistors R3 and R6 prevent the control circuitry of the first and second control channels from loading SCL 13 and SDL 15. During the first operational state, V2 applied to the collects of transistors Q1 and Q2 is in the low state, and thus, the application of signals to Q1 and Q2 does not have any effect on the control circuitry associated with terminals 17 and 19.

When receiver 100 is in a second operational state (i.e., receiver 100 is connected to a power source and in the ON state), the DAT and CLK terminals of microcontroller 21 are in a high-impedance state, and the PWM1 and PWM2 terminals may be used to output the first and second PWM signals, respectively. The first and second PWM signals may be referred to herein as second control signals. The PWM1 terminal is electrically coupled to SDL 15 and thereby provides the first PWM signal to the first control channel of first circuit board 10 to enable generation of output signal 17. Similarly, the PWM2 terminal is electrically coupled to SCL 13 and thereby provides the second PWM signal to the second control channel of first circuit board 10 to enable generation of output signal 19. According to the exemplary embodiment, the first and second PWM signals are generated by microcontroller 21 in dependence upon the voltage data read from EEPROM 11 when receiver 100 is in an OFF state. In the aforementioned manner, SCL 13 and SDL 15 are shared between two different operations of microcontroller 21. Allowing the two lines to be shared between two different components that are used during two different operations, wherein different types of signals are transmitted during the two operations reduces the number of connectors required between boards 10 and 20.

When the first and second PWM signals are transmitted to the control circuitry of first circuit board 10, as described above, a potential problem exists in that EEPROM 11 can be inadvertently written to and thereby corrupt data stored within EEPROM 11. In particular, when the PWM signals are transmitted over the IIC bus, if a start condition is generated (i.e., a transition from a logic high state to a logic low state on SDL 15, while SCL 13 is in a logic high state), and address information generated by the phasing of the PWM signals corresponds to address information of EEPROM 11, then EEPROM 11 may be inadvertently written to by microprocessor 21. The potential for the occurrence of such signals that correspond to the above is unlikely. However, one approach for avoiding this potential problem is to redundantly store data in multiple locations in EEPROM 11. According to the exemplary embodiment, a given unit of data may be redundantly stored in five different memory locations of EEPROM 11. Thereafter, when the data is read, the component (e.g., processor 21) reading the data will apply a statistical threshold to determine whether the data has been corrupted. For example, if the data is stored in five different memory locations within EEPROM 11, the component reading the data may determine that the data is valid if three out of the five memory locations provide the same data. Other statistical thresholds may, of course, be employed.

Figure 2:
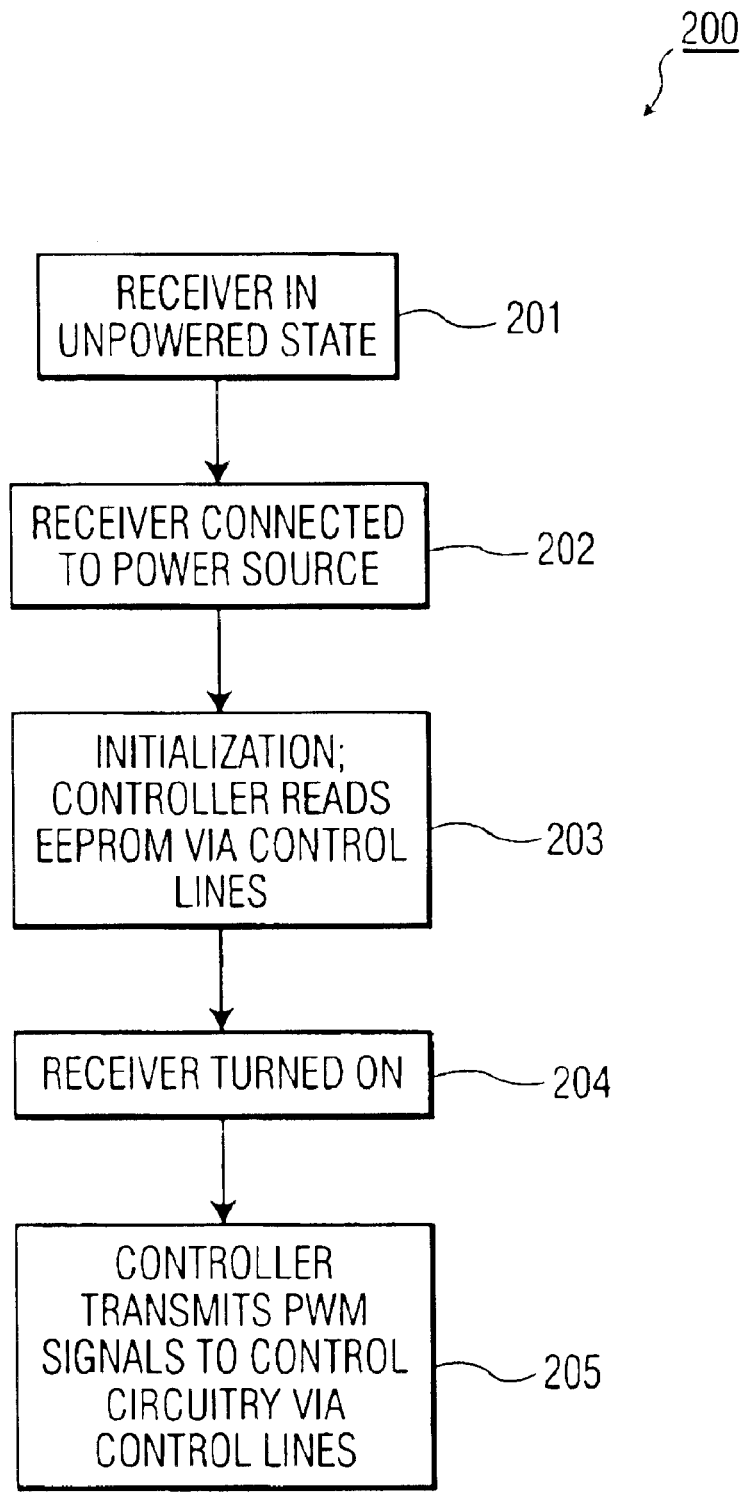
FIG. 2 is a flowchart illustrating exemplary steps for practicing the present invention.

Referring now to FIG. 2, a flowchart 200 illustrating exemplary steps for practicing the present invention is shown. For purposes of example and explanation, the steps of FIG. 2 will be described with reference to the television signal receiver 100 of FIG. 1.

At step 201, receiver 100 is in an unpowered state. That is, receiver 100 is not connected to an electrical power source, such as a household plug outlet or the like. At step 202, receiver 100 is connected to an electrical power source (e.g., plugged in), but is not turned ON. That is, receiver 100 enters the first operational state at step 202. As previously indicated herein, certain components of receiver 100, such as microcontroller 21 and EEPROM 11 receive electrical power from a standby power source, namely voltage source V1, during the first operational state.

In response to being connected to a power source at step 202, process flow advances to step 203, where receiver 100 performs an initialization process. In particular, as part of this initialization process, microcontroller 21 operates as a master IC and transmits the first control signals to EEPROM 11 via SCL 13 and SDL 15 to thereby read data from EEPROM 11, which operates as a slave IC. According to an exemplary embodiment, the data read from EEPROM 11 by microcontroller 21 comprises voltage data used to control deflection operations of receiver 100. Microcontroller 21 stores the read data in an internal memory (not shown), and retains it there as long as receiver 100 is plugged in, or otherwise powered.

Next, at step 204, receiver 100 is turned ON, for example, via a user input to an input terminal such as a hand-held remote control unit. As previously indicated herein, receiver 100 is in the second operational state when it is both connected to a power source, and turned ON. Accordingly, step 204 causes receiver 100 to enter the second operational state. During the second operational state, process flow advances to step 205 where microcontroller 21 transmits the second control signals, namely the first and second PWM signals, to the control circuitry of first circuit board 10. That is, the PWM1 terminal outputs the first PWM signal to SDL 15, and thereby provides the first PWM signal to the first control channel of first circuit board 10 to enable generation of output signal 17. Similarly, the PWM2 terminal outputs the second PWM signal to SCL 13, and thereby provides the second PWM signal to the second control channel of first circuit board 10 to enable generation of output signal 19. As previously indicated, the first and second PWM signals may be generated by microcontroller 21 in dependence upon the voltage data read from EEPROM 11 at step 203. In the aforementioned manner, SCL 13 and SDL 15 are shared between two different operations of microcontroller 21.

Although the present invention has been described in relation to a television signal receiver, the invention is applicable to various systems, either with or without display devices, and the phrases "television signal receiver" or "receiver" as used herein are intended to encompass various types of apparatuses and systems including, but not limited to, television sets or monitors that include a display device, and systems or apparatuses such as a set-top box, video tape recorder (VTR), digital versatile disk (DVD) player, video game box, personal video recorder (PVR) or other apparatus that may not include a display device.

While this invention has been described as having a preferred design, the present invention can be further modified within the spirit and scope of this disclosure. For example, the control lines disclosed herein may be used in different operational states of an apparatus to control devices other than a memory or deflection circuitry. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A television signal receiver, comprising:
    a first circuit board including a memory and control circuitry for controlling an operation of the receiver, the control circuitry controlling the operation of the receiver in response to operational data stored in the memory; and
    a second circuit board operably coupled to the first circuit board via IIC bus lines, the second circuit board including a controller, coupled to the IIC bus lines, for generating first control signals in accordance with a first signal format in a first operational state and second control signals in accordance with a second signal format in a second operational state,
    wherein the memory and the control circuitry are coupled to the IIC bus lines, and the controller transmits the first control signals to the memory to retrieve the operational data via the IIC bus lines without affecting the control circuitry in the first operational state, and transmits the second control signals to the control circuitry to control the control circuitry in response to the retrieved operational data via the control lines.

2. The television signal receiver according to claim 1, wherein the first operational state corresponds to an OFF state of the receiver, and the second operational state corresponds to an ON state of the receiver.

3. The television signal receiver according to claim 1, wherein the first control signals correspond to IIC compliant signals and the second control signals are PWM signals.

4. The television signal receiver according to claim 1, wherein the control circuitry is coupled to the IIC bus lines via bipolar transistors.

5. A signal processing apparatus, comprising:
   a first circuit board including first electronic circuitry, and second electronic circuitry for controlling at least one operation of the apparatus; and
   a second circuit board operably coupled to the first circuit board via control lines, the second circuit board including a controller, coupled to the control lines, for generating first control signals in accordance with a first signal format in a first operational state and second control signals in accordance with a second signal format in a second operational state,
   wherein the first and second electronic circuitry are coupled to the control lines, and the controller transmits the first control signals to the first electronic circuitry to retrieve operational data via the control lines without affecting the second electronic circuitry in the first operational state, and transmits the second control signals to the second electronic circuitry to control the second electronic circuitry in response to the operational data via the control lines.

6. The signal processing apparatus of claim 5, wherein the first electronic circuitry comprises a memory circuit having operational data stored therein for controlling the second electronic circuitry, the controller retrieving the operational data in the first operational state and controlling the second electronic circuitry in response to the operational data in the second operational state.

7. The signal processing apparatus of claim 6, wherein the operation data comprises voltage data for controlling deflection circuitry, and the second electronic circuitry controls the deflection circuitry in response to the voltage data.

8. The signal processing apparatus of claim 7, wherein the first operational state corresponds to the apparatus being in an OFF state and the controller and the first electronic circuitry is powered by a standby power supply, and the second operational state corresponds to the apparatus being in the ON state.

9. The signal processing apparatus of claim 6, wherein the first control signals enable the controller to read data from the memory circuit.

10. The signal processing apparatus of claim 9, wherein the second control signals enable the second electronic circuitry to control a deflection operation of the apparatus in response to data read from the memory circuit.

11. The signal processing apparatus of claim 5, wherein the first control signals comply with the IIC standard and the second control signals comprise pulse width modulated signals.

12. The signal processing apparatus of claim 5, wherein the control lines comprise an inter-integrated circuit bus.

13. The signal processing apparatus of claim 5, wherein the second electronic circuitry is coupled to the control lines via bipolar transistors.

14. A method of operating a television signal receiver, the method comprising steps of:
   providing first and second circuit boards coupled via control lines, the first circuit board having a memory device and control circuitry included thereon and coupled to the control lines, the second circuit board having a controller included thereon and coupled to the control lines;
   transmitting via the control lines, first control signals in accordance with a first signal format from the controller on the second circuit board to the memory device on the first circuit board to retrieve operational data from the memory device, without affecting the control circuitry, when the receiver is in a first operational state; and
   transmitting via the control lines, second control signals in accordance with a second signal format from the controller to the control circuitry on the first circuit board in response to the retrieved operational data when the receiver is in a second operational state.

15. The method of claim 14, wherein the first operational state corresponds to the receiver being in the OFF state wherein the controller and the memory device is supplied by a standby power supply, and the second operational state corresponds to the receiver being in an ON state.

16. The method of claim 15, wherein the first control signals enable the controller to read data from the memory device.

17. The method of claim 16, further comprising the step of controlling deflection circuitry via the control circuitry in response to data read from the memory device.

18. The method of claim 14, wherein the first transmitting step comprises transmitting the first control signals in accordance with the IIC standard.

19. The method of claim 14, wherein the second transmitting step comprises transmitting the second control signals as PWM signals.

20. The method of claim 14, wherein the providing step comprises providing the first circuit board having the control circuitry coupled to the control lines via bipolar transistors.

* * * * *

UNITED STATES PATENT AND TRADEMARK OFFICE
CERTIFICATE OF CORRECTION

PATENT NO. : 6,870,578 B2
DATED : March 22, 2005
INVENTOR(S) : William John Testin It is certified that error appears in the above-identified patent and that said Letters Patent is hereby corrected as shown below:

Title page,
Item [54], Title, should be amended to reflect the following:
-- APPARATUS AND METHOD FOR SHARING SIGNAL CONTROL LINES BETWEEN OPERATIONAL STATES --

Signed and Sealed this

Thirty-first Day of May, 2005

JON W. DUDAS
*Director of the United States Patent and Trademark Office*